(No Model.) 2 Sheets—Sheet 1.

T. B. CLATWORTHY.
MACHINERY FOR THE MANUFACTURE OF HOLLOW BODIES FROM METAL DISKS.

No. 492,571. Patented Feb. 28, 1893.

Witnesses:
O. L. Sundgren
D. N. Hayford

Inventor:
Thomas B. Clatworthy
by attorneys
Brown & Seward (No Model.) 2 Sheets—Sheet 2.
T. B. CLATWORTHY.
MACHINERY FOR THE MANUFACTURE OF HOLLOW BODIES FROM METAL DISKS.

No. 492,571. Patented Feb. 28, 1893.

Witnesses:
C. L. Sundgren
D. H. Hayport

Inventor:
Thomas B. Clatworthy,
by attorneys
Brown & Seward

UNITED STATES PATENT OFFICE.

THOMAS B. CLATWORTHY, OF WATERBURY, CONNECTICUT.

MACHINERY FOR THE MANUFACTURE OF HOLLOW BODIES FROM METAL DISKS.

SPECIFICATION forming part of Letters Patent No. 492,571, dated February 28, 1893.

Application filed May 3, 1892. Serial No. 431,614. (No model.)

*To all whom it may concern:*

Be it known that I, THOMAS B. CLATWORTHY, of Waterbury, in the county of New Haven and State of Connecticut, have invented a new and useful Improvement in Machinery for the Manufacture of Hollow Bodies from Metal Disks, of which the following is a specification.

This invention relates to the manufacture, from copper, brass, steel or other ductile metal disks, of hollow objects or bodies such for instance as culinary vessels, heads or cylindrical sections of boilers for the generation of steam or for domestic purposes and short cylinders which may by drawing be converted into tubes.

I will proceed to describe with reference to the accompanying drawings a machine embodying my invention and afterward point out its novelty in the claim.

Figure 1:
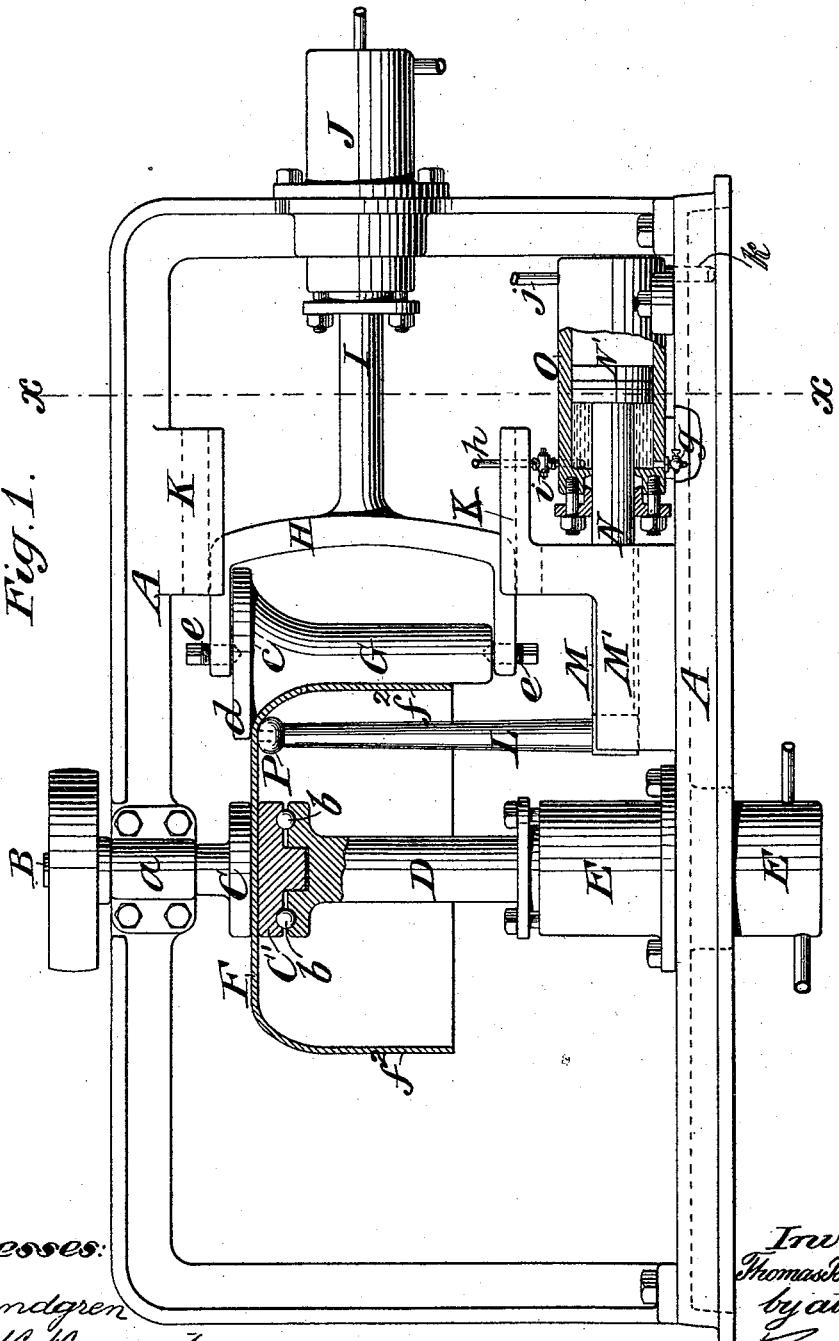
Figure 2:
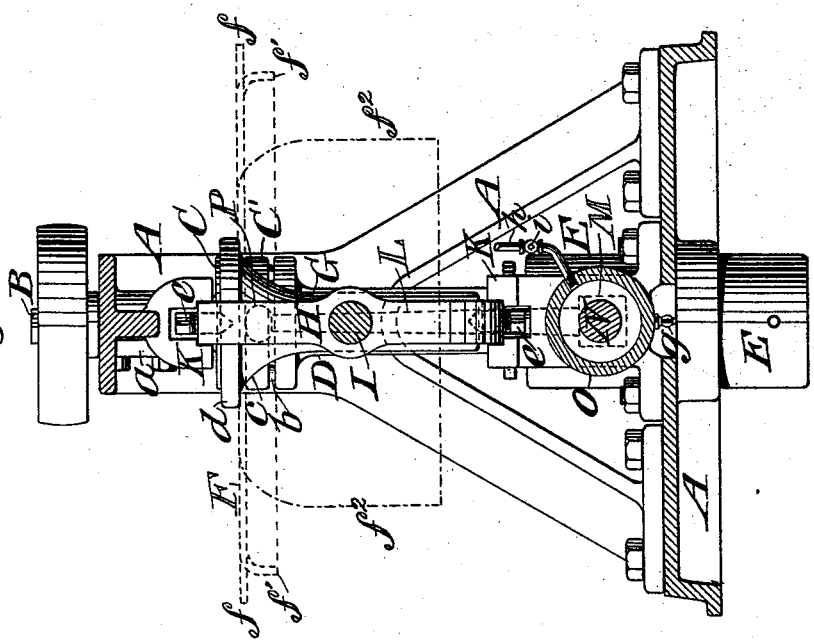

Figure 1 represents a front elevation of the machine partly in section. Fig. 2 represents a vertical section at right angles to Fig. 1 taken in the line $x\ x$ and viewed from the right.

Similar letters of reference designate corresponding parts in both the figures.

A is the framing of the machine in the upper part of which is the bearing $a$ for an upright rotary shaft B on the lower end of which is one member C of a clamp C C', the other member C' of which is supported on the head of the upright plunger D of a hydraulic press, the cylinder E of which is supported on or in the base of the framing A, the center of the plunger D being in line with the axis of the shaft B. The opposite faces of the clutch members C C' may be toothed or roughened in any suitable manner to enable them to firmly grasp between them a disk F of metal to be cupped or formed into a hollow body or shell. The lower member C' of the clamp is supported on the head of the plunger D by a ball-bearing $b$ so that it may rotate with the disk F while the latter is caused to rotate by the rotation of the shaft B and clamp member C, the necessary pressure to hold the disk in contact with the driving member C of the clamp being produced by the hydraulic press.

G is a roller having its longitudinal profile of the form of the profile of the side of the hollow body or object to be produced. In the example represented the greater portion of the length of the said roller is cylindrical but the upper portion $c$ flares outward with a hollow curvature terminating in a broad flange $d$. The said roller is supported in a vertical position in or between bearings or centers $e\ e$ in a yoke or carrier H at such a height that the lower face of the flange $d$ is in the same plane as the lower face of the upper member C of the clamp. The yoke or carriage H is connected with the horizontal plunger I of a hydraulic press the cylinder J of which is secured upon or in the framing A.

To keep the roller G upright and parallel with the rotary shaft B and plunger D, the top and bottom of the yoke or carriage are fitted to run in stationary horizontal guides K provided upon the bed plate and upper part of the framing, the said guides being radial to the axis of the rotary shaft B and clamp C C'.

L is an upright post constituting an anvil situated between the axis of the roller G and the axis of the shaft B and clamp C C'. This post or anvil is represented as having its crown composed of a roller P; it is so supported in a horizontal slide or carriage M that its crown is maintained under the flange $d$ of the roller G and at a distance from said flange about equal to the thickness of the disk F to be operated upon. The said slide or carriage M is connected with the rod N of a piston N' which works in a cylinder O which contains water on that side of the said piston on which the anvil L is situated, the so contained water when confined in the cylinder serving to resist the movement of the anvil L toward the axis of the rotary shaft and clamp. To regulate this resistance and so control the movement of the anvil in the direction mentioned, there is a pet cock or controllable escape valve $g$ provided in the said cylinder besides a pipe $h$ for supplying water thereto by a pump or from a reservoir, and a cock $i$ for closing said pipe. The outer end of the cylinder O may be open to the atmosphere or may be closed and furnished with pipes for the admission and discharge of water behind the piston.

The operation of the machine is as follows: The metal disk to be operated upon may be introduced into this machine in a flat form as indicated at $f\ f$ in Fig. 2, or it may, before its introduction into the machine, have its edges turned in as shown at $f'$ $f'$ in the same figure by an ordinary flanging machine. The disk may be operated upon in a heated state or cold according to the nature of the metal; it is introduced into the machine concentrically to the rotary shaft B, between the clamp members C C', the lower one C' of which is then pressed up tightly by the hydraulic press D E. The roller G is then brought by the hydraulic press I J close up to the edge of the disk with its flange $d$ overlapping the edge. The anvil L P is then, by admitting water to the cylinder O through the pipe $h$ in front of the piston N' and closing the pet cock $g$, brought to a position under the marginal portion of the disk and under the edge of the flange $d$ of the roller G. The cock $i$ is then closed and rotary motion is given to the shaft B and clamp C C' and the disk is thereby caused to rotate in contact with the roller G which is rotated by the contact of the disk. The hydraulic press I J is then set in operation to cause the roller G to approach the axis of the rotary shaft and clamp and the pet cock $g$ is slightly opened. The edge of the disk is by this operation of the roller G, turned inward and caused to follow the profile of the roller G, the disk thereby assuming the form of a cup or cylinder which is prolonged in a direction parallel with the axis of the disk as it is reduced in diameter. In this operation the inner or under portion of the disk close to or opposite the flange $d$ of the roller G where the turning in begins, is supported by the anvil L P which is held toward the roller G by the resistance of the water in the cylinder N in front of the piston N', the said resistance being made to yield to the inward movement of the roller G by the gradual escape of water from the cylinder O by the pet cock $g$, such escape being controlled according to the requirements by giving the said cock more or less opening. When the sides of the cup or cylinder have been sufficiently prolonged and contracted as shown at $f^2$ in Fig. 2, the operation of the machine is stopped. The hydraulic press is then operated to draw back the roller G, and the hydraulic press D E is operated to lower the plunger D and lower clamp member C' sufficiently to allow the cup or cylinder to be removed over the anvil.

What I claim as my invention, and desire to secure by Letters Patent, is—

In a machine for the manufacture of hollow objects or bodies from disks of metal, the combination of a rotary shaft and disk holding clamp, a flanged roller for operating on one side of the disk, an anvil arranged opposite the flange of the first mentioned roller for supporting the other side of the disk, a carriage for said roller, means of moving said carriage toward and from said shaft and clamp, a carriage for said anvil movable toward and from said shaft and clamp, a hydraulic cylinder containing a piston connected with the last mentioned carriage to produce a yielding resistance of the anvil to the movement of said roller and a valve or cock in said cylinder for producing a regulated escape of water therefrom and controlling said yielding resistance, substantially as herein set forth.

THOMAS B. CLATWORTHY.

Witnesses:
FREDK. HAYNES,
GEORGE BARRY.